United States Patent
Bircher et al.

(10) Patent No.: US 11,465,352 B1
(45) Date of Patent: Oct. 11, 2022

(54) THREE-DIMENSIONAL PRINTER RESIN VAT WITH HEATED SUPPORT WINDOW

(71) Applicant: TETHON INCORPORATED, Omaha, NE (US)

(72) Inventors: Walter Bircher, Omaha, NE (US); Gregory C. Pugh, Council Bluffs, IA (US); Justin C. Douglas, Irmo, SC (US); Karen A. Linder, Omaha, NE (US)

(73) Assignee: Tethon Incorporated, Omaha, NE (US)

( * ) Notice: Subject to any disclaimer, the term of this patent is extended or adjusted under 35 U.S.C. 154(b) by 183 days.

(21) Appl. No.: 16/826,118

(22) Filed: Mar. 20, 2020

Related U.S. Application Data (60) Provisional application No. 62/821,716, filed on Mar. 21, 2019.

(51) Int. Cl.
| | | |
|---|---|---|
| *B29C 64/255* | (2017.01) | |
| *B29C 64/135* | (2017.01) | |
| *B33Y 50/02* | (2015.01) | |
| *B29C 64/393* | (2017.01) | |
| *B33Y 30/00* | (2015.01) | |
| *B29C 64/295* | (2017.01) | |

(52) U.S. Cl.
CPC .......... *B29C 64/255* (2017.08); *B29C 64/135* (2017.08); *B29C 64/295* (2017.08); *B29C 64/393* (2017.08); *B33Y 30/00* (2014.12); *B33Y 50/02* (2014.12)

(58) Field of Classification Search
None
See application file for complete search history.

(56) References Cited

U.S. PATENT DOCUMENTS

| | | | | |
|---|---|---|---|---|
| 4,771,179 | A | * 9/1988 | Ijiri | G21F 1/125 250/515.1 |
| 2003/0044598 | A1 | * 3/2003 | Berg | B29C 39/10 427/372.2 |

FOREIGN PATENT DOCUMENTS

WO  WO-2016078838 A1 * 5/2016 ........... B29C 64/295

\* cited by examiner

*Primary Examiner* — Timothy Kennedy
*Assistant Examiner* — Guy F Mongelli
(74) *Attorney, Agent, or Firm* — Kevin E. West; Advent, LLP (57) ABSTRACT

An additive-manufacturing resin vat system can include a resin vat, a flexible plastic film, a transparent support window, a transparent conductive coating, a support tray, and a set of metal contacts. The resin vat can carry a resin-print material mixture. The flexible plastic film can mechanically seal to a bottom of the resin vat. The transparent support window can support the flexible plastic film. The transparent conductive coating can be formed on at least one side of the transparent support window. The support tray can define an outer tray portion and an open tray interior, the outer tray portion carrying the transparent support window. The metal contacts can be carried by the outer tray portion and configured to electrically couple with the transparent conductive coating. The transparent conductive coating is configured to generate heat upon receiving an electrical current via the metal contacts.

14 Claims, 8 Drawing Sheets

THREE-DIMENSIONAL PRINTER RESIN VAT WITH HEATED SUPPORT WINDOW

RELATED APPLICATIONS

This application claims priority to U.S. Provisional Application No. 62/821,716, filed Mar. 21, 2019, and entitled "THREE-DIMENSIONAL PRINTER RESIN VAT WITH HEATED SUPPORT WINDOW." The contents of U.S. Provisional Application No. 62/821,716 are hereby incorporated by reference thereto.

BACKGROUND

Vat polymerization is a form of additive manufacturing (e.g., three-dimensional (3D) printing) that can use a vat of liquid photopolymer resin, out of which the desired object is constructed layer by layer. An ultraviolet (UV) light can be used to cure or harden the resin where required, while a platform can move (e.g., upwards or downwards) the object being made after each new layer is cured. As the process uses liquid to form objects, there is no structural support from the un-cured material during the build phase, unlike powder-based methods. Resins can be cured and thereby hardened using a process of photo polymerization (e.g., using UV light).

DRAWINGS

The Detailed Description is described with reference to the accompanying figures.

DETAILED DESCRIPTION

Overview

Vat polymerization is a form of additive manufacturing (e.g., three-dimensional (3D) printing) that can use a vat of liquid photopolymer resin, out of which the desired object is constructed layer by layer. It has been found that heating of the resin proximate the cure zone can improve photo polymerization process. Such heating has thus far been achieved by providing heating elements in the perimeter walls of the vat and relying on an additional stirring mechanism to promote more uniform heating of the resin.

The present system and method can eliminate the need for an additional stirring mechanism and can promote even, yet localized heating of the resin in the vat zone where the increased temperature is generally desired, that is, proximate the bottom of the vat volume. In an embodiment, the flexible plastic film (e.g., fluorinated ethylene propylene (FEP) or perfluoroalkoxy (PFA)) can define the bottom of the vat volume. In the present system and method, the flexible plastic film can be supported there below by a transparent support window. In an embodiment, the transparent support window can be rigid, able to transmit light (e.g., ultraviolet (UV) light), and thermally stable under the desired heat levels (e.g., temperature sufficient for curing). In some embodiments, the transparent support window can be made of a glass or a plastic.

The transparent support window can, in turn, be provided, at least on its face opposite that directly supporting the flexible plastic film, with a layer of a transparent (e.g., UV transparent), conductive coating capable of resistively heating the resin proximate the flexible plastic film. In some embodiments, the transparent conductive coating may be formed of a transparent conductive oxide (TCO) or a transparent conductive polymer (TCP). Upon coupling the transparent conductive coating with an energized pair of electrodes, the transparent conductive coating can generate enough resistance to locally heat the layer of resin proximate the flexible plastic film. The use of such transparent conductive coating on the support window can achieve the desired heating of the entirety of the layer of resin proximate the flexible plastic film, without the need for stirring and/or for heating more of the resin than needed to achieve the desired print quality.

In some embodiments, one or more temperature sensors (e.g., positioned proximate the flexible plastic film and/or at chosen distance there above), along with a controller, may be employed to determine the temperature at one or more points in the vat, and to control, accordingly, the amount of heat generated by the transparent conductive coating. In an embodiment, the one or more temperature sensors can be mounted in a wall or a base of the vat. In an embodiment, the heating may be controlled such that a temperature registered at a first temperature sensor proximate the flexible plastic film is at or above a desired set point. In an embodiment, the first temperature sensor can be positioned proximate and/or adjacent the transparent conductive layer (e.g., to measure the temperature at the heat source), determining the temperature in the resin proximate the flexible plastic film based on a known approximate temperature offset. In an embodiment, a second temperature sensor may be employed, for example, at location proximate and/or adjacent the transparent conductive layer (e.g., to measure temperature at heat source), at another location proximate the flexible plastic film (e.g., to help ensure even heating), or at a location spaced a distance (e.g., one centimeter (1 cm)) above the flexible plastic film. In an embodiment, the second temperature sensor spaced above the flexible plastic film can be used to help maintain the temperature of the resin at that height at a temperature below the desired set point (e.g., 5-10° C. below the set point). In an embodiment, the resin can be evenly heated to a desired set or cure temperature proximate to and across the exposed surface area of the flexible plastic film. In an embodiment, the set or cure temperature may be 50-60° C. (e.g., 55° C.). It is to be understood that other resins or materials being printed may have another set or cure temperature (e.g., 60° C. or greater, 100° C. or greater, etc.), and such cure or set temperatures are considered to be within the scope of the present disclosure.

In an embodiment, the layer of the transparent conductive coating may be continuous and/or may extend across substantially the entire area of the support window and thereby distributed and configured to promote even heating of an entire resin layer proximate the flexible plastic film. In an embodiment, the transparent conductive coating may extend across substantially the entire area of the support window in the form of a discontinuous layer with closely spaced portions (e.g., portions separated by three millimeters (3 mm) or less). In embodiments, the transparent conductive coating may include one or more of indium tin oxide (ITO), fluorine doped tin oxide (FTO), doped zinc oxide (e.g., aluminum-doped zinc oxide (AZO)), or another transparent conductive oxide (TCO); Poly(3,4-ethylenedioxythiophene) (PEDOT), PEDOT doped with poly(styrene sulfonate) (PEDOT-PSS), or another transparent conductive polymer (TCP); and/or a carbon nanotube (CNT) thin film. In an embodiment, the transparent conductive coating may be razor thin (e.g., nanometers to microns thick, such as 10 nm to 100 µm; 10 nm to 50 µm; 10 nm to 100 nm; less than 25 µm; less than 10 µm; or less than 100 nm).

In an embodiment, the transparent conductive coating can be located at least on the side of the support window opposite the flexible plastic film. In an embodiment, the transparent conductive coating can be located on both major surfaces of the support window, with sufficient conductive material along the edges thereof to electrically couple the two major surfaces. In embodiments, the transparent conductive coating may further include a final clear topcoat (e.g., a high heat clear enamel paint) to protect underlying conductive layers from damage (e.g., protection from fingerprints, scratches, etc.) that may otherwise adversely affect heating properties. In embodiments, chosen regions (e.g., thin regions) may not receive such a clear topcoat (i.e., the topcoat may not be conductive) to allow for electrical bonding of the underlying transparent conductive coating to bus bars, metal contacts, etc.

Example Implementations

Figure 1:
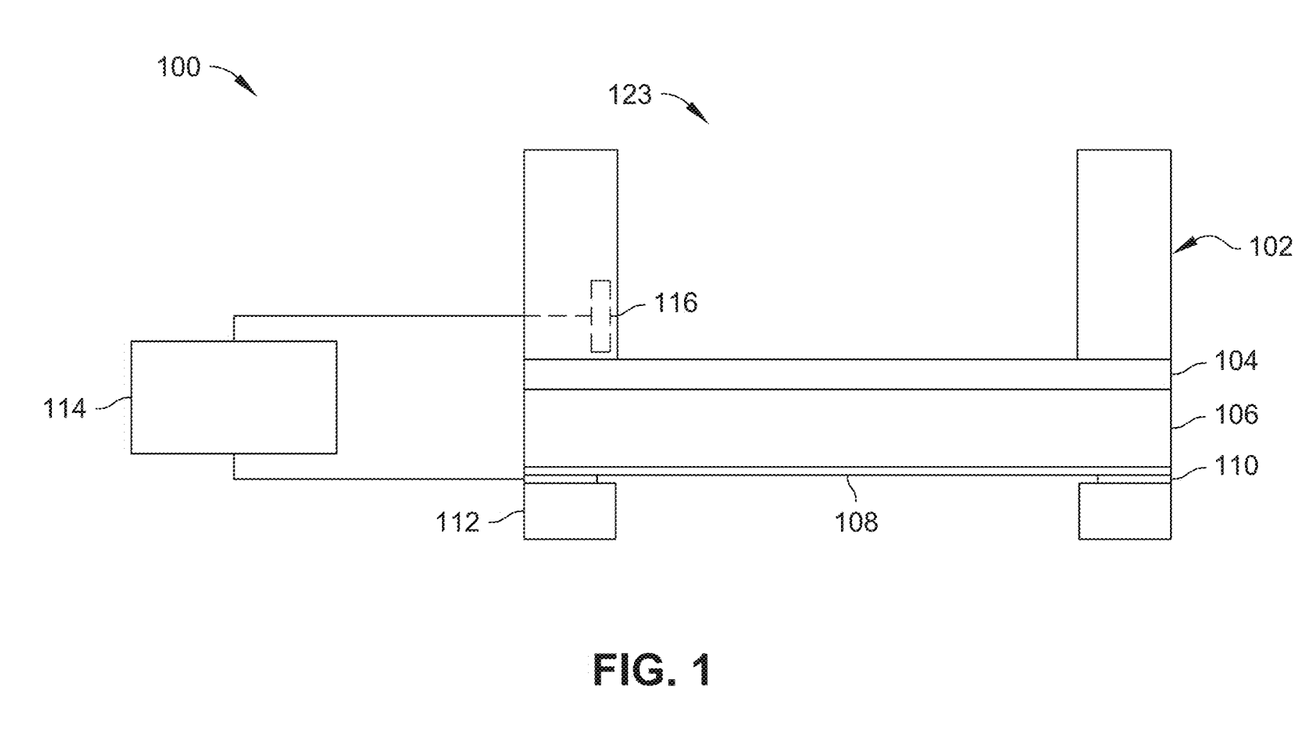
FIG. 1 is a schematic, side, cut-away view of an additive-manufacturing (e.g., three-dimensional (3D) printing) resin vat employing a heater including a transparent or semi-transparent conductive coating, in accordance with an embodiment of the present disclosure.
Figure 2:
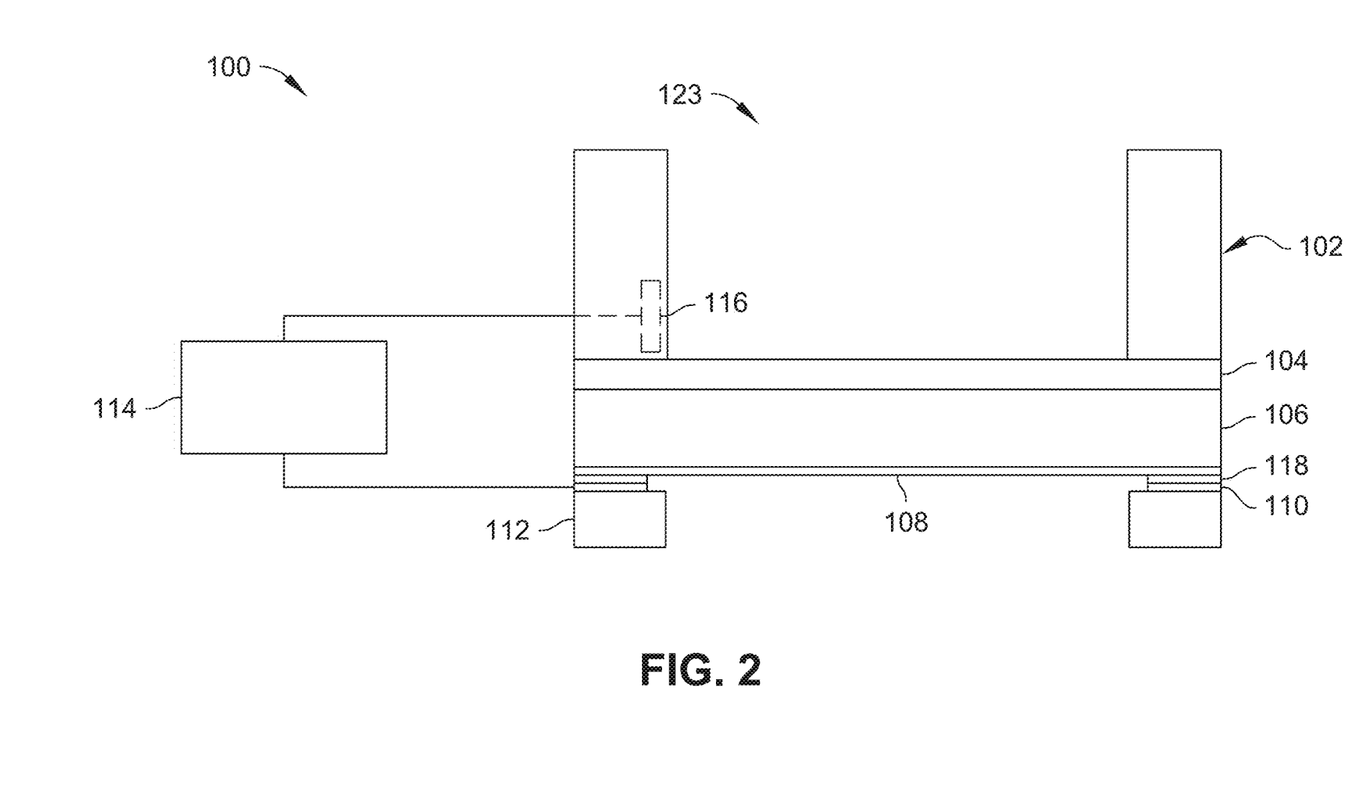
FIG. 2 is a schematic, side, cut-away view of an additive-manufacturing (e.g., three-dimensional (3D) printing) resin vat employing a heater including a transparent conductive coating and a pair of metal bus bars, in accordance with an embodiment of the present disclosure.
Figure 3:
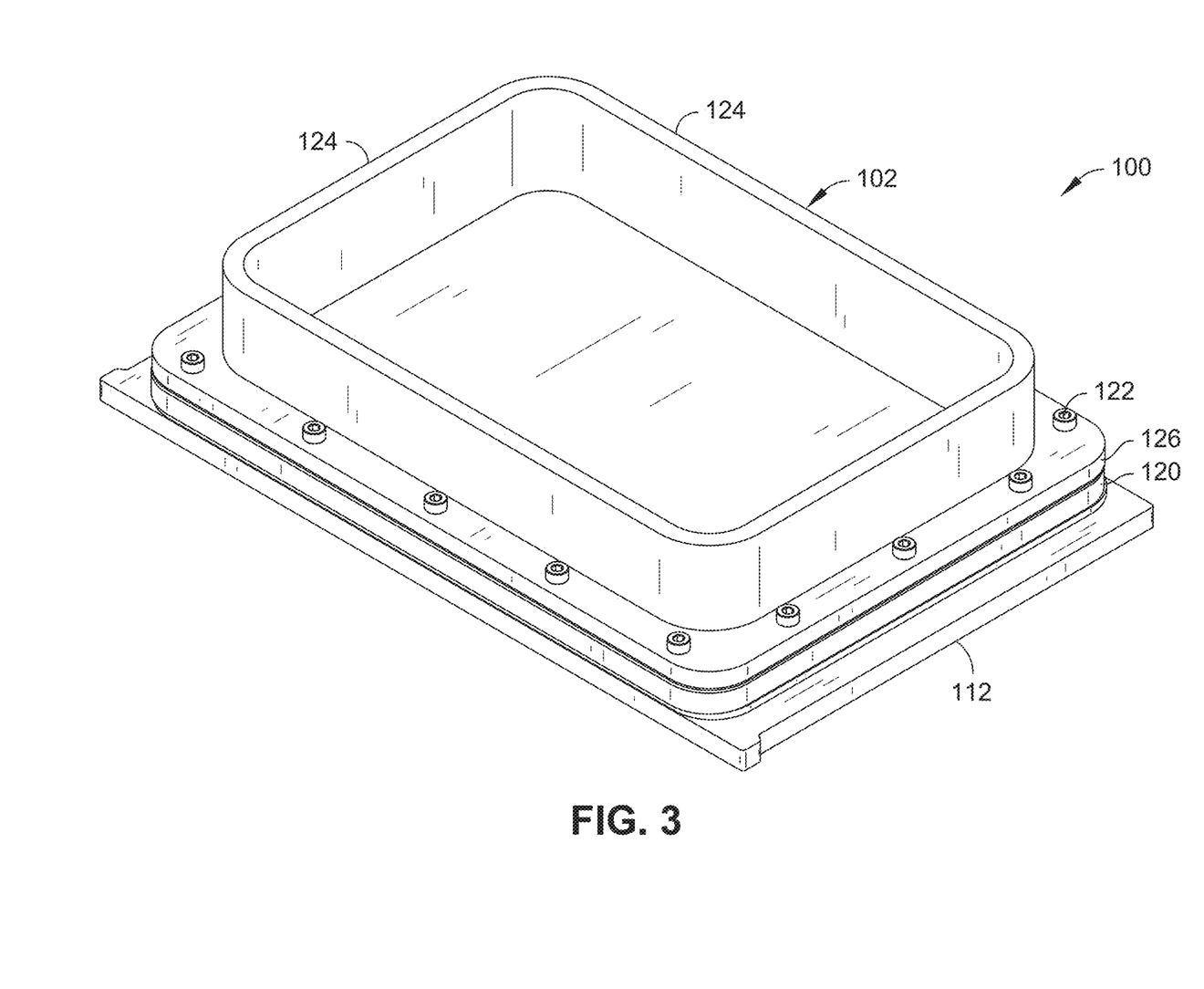
FIG. 3 is a top, isometric view of an additive-manufacturing (e.g., three-dimensional (3D) printing) resin vat assembly, in accordance with an embodiment of the present disclosure.
Figure 4:
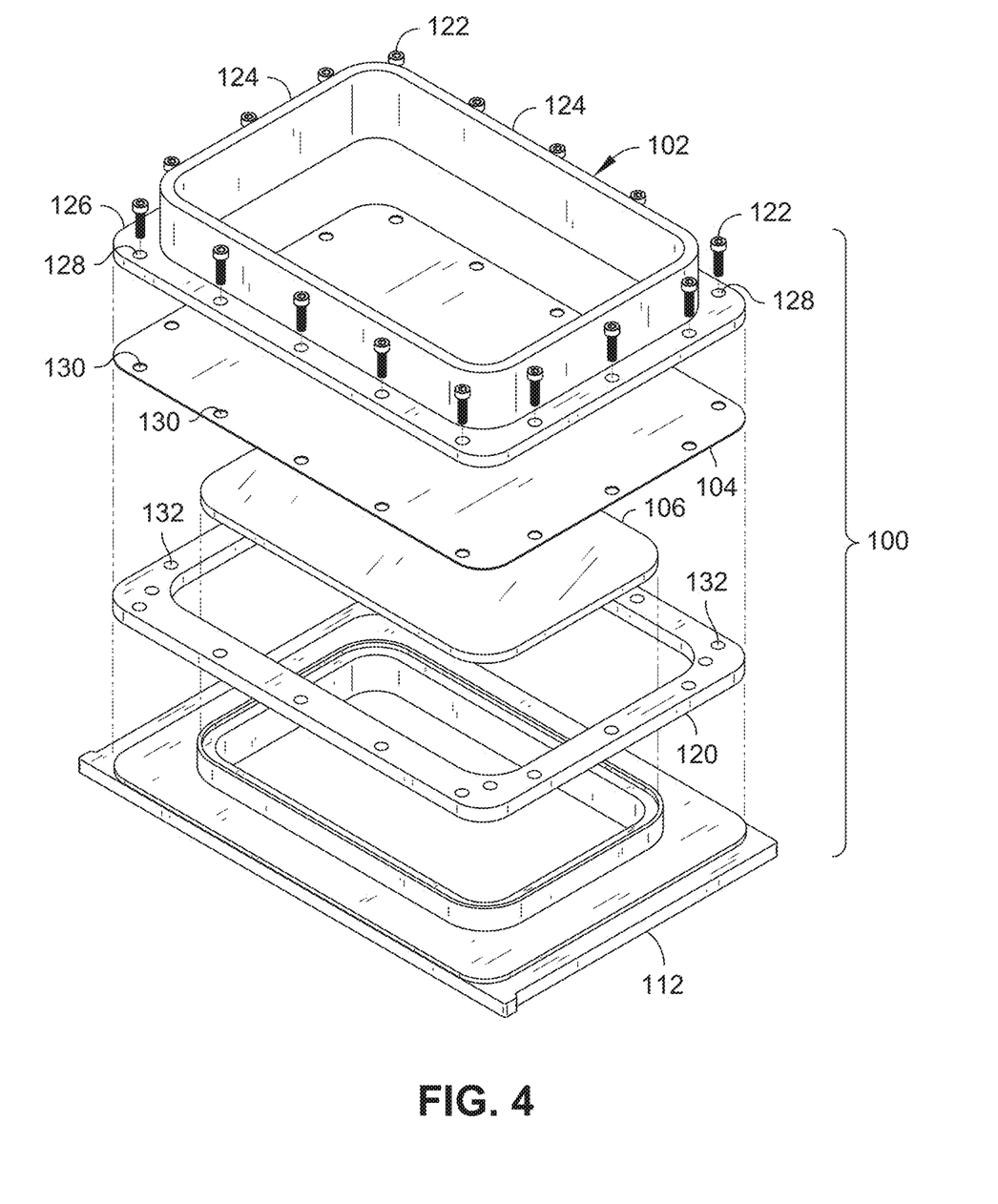
FIG. 4 is an exploded, top, isometric view of the additive-manufacturing (e.g., three-dimensional (3D) printing) resin vat assembly shown in FIG. 3.
Figure 5:
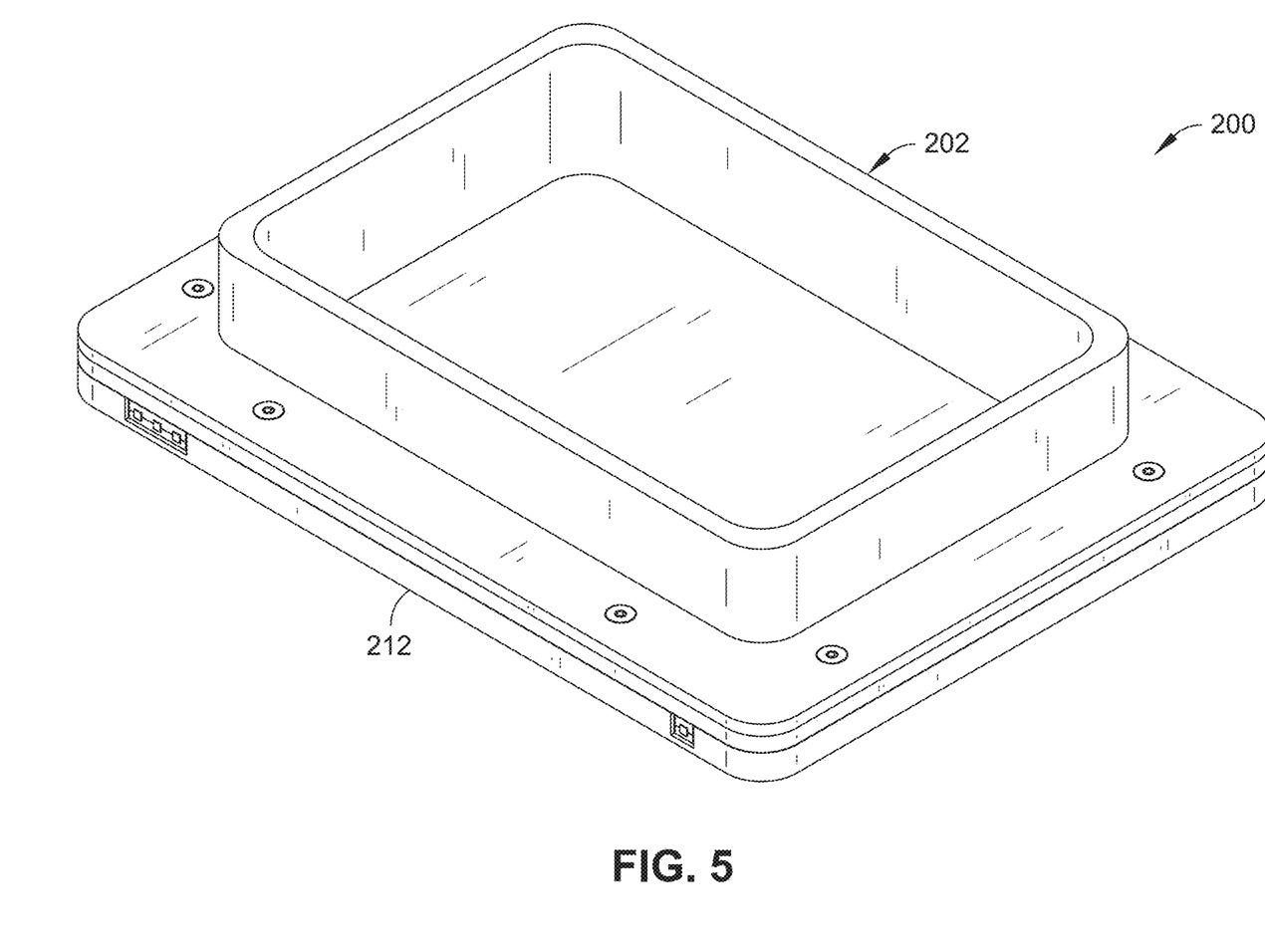
FIG. 5 is a top, isometric view of an additive-manufacturing (e.g., three-dimensional (3D) printing) resin vat assembly, in accordance with an embodiment of the present disclosure.

FIG. 1 shows an additive-manufacturing (e.g., three-dimensional (3D) printing) resin vat system 100 (e.g., resin vat assembly), in accordance with an embodiment of the present disclosure. The resin vat system 100 can generally include a resin vat 102 for carrying a resin-print material mixture (not shown), a flexible plastic film 104, a transparent support window 106, a transparent conductive coating 108, a set of metal contacts 110, a support tray 112, a controller 114, and at least one temperature sensor 116. FIG. 2 shows the same additive-manufacturing (e.g., three-dimensional (3D) printing) resin vat system 100 as that shown in FIG. 1, except with the addition of an additional set of metal bus bars 118. The resin vat system 100 can be configured to facilitate vat polymerization, which is a form of additive manufacturing (e.g., three-dimensional (3D) printing) that can use a vat (e.g., a container) of liquid photopolymer resin, out of which the desired object can be constructed layer by layer. FIGS. 3 and 4 generally illustrate the resin vat system 100, without the electrical components associated therewith. Specifically, FIGS. 3 and 4 focus on the resin vat 102, the flexible plastic film 104, and the transparent support window 106, while further showing an attachment tray 120 and related fasteners 122 (e.g., threaded fasteners such as screws; or retaining pins).

The resin vat 102 (e.g., serving as a wall structure) and the flexible plastic film 104 mounted in mechanical-sealing contact with a bottom of the resin vat 102 (e.g., acting as a containment bottom) can together serve as the immediate containment volume for a given amount of liquid photopolymer resin and print material mixture (not shown) to be carried thereby. The resin vat 102, opposite the flexible plastic film 104, can define a top vat opening 123, for example, for receiving the resin/print mixture and/or other components of the printing system (not shown). As such, the resin vat 102 and the flexible plastic film 104 can be chosen to be mechanically and chemically durable enough to withstand the vat polymerization process. The resin vat 102 may be made, for example, of a glass, ceramic, composite, plastic or a corrosion-resistant metal. The flexible plastic film 104 can, for example, be made of fluorinated ethylene propylene (FEP) or perfluoroalkoxy (PFA). The flexible plastic film can be, by way of example, 25-1000 micron thick, such as 100-micron (0.1 millimeter (mm)) to 1000-micron (1 mm) thick.

The resin vat 102 can include a plurality of interconnected, vertically-extending (e.g., relative to the flexible plastic film 104 and the transparent support window 106) vat walls 124 (e.g., four), as seen in FIGS. 3 and 4, and may further include a vat base 126 to which the vat walls 124 are coupled (e.g., molded or otherwise attached). The vat base 126 may extend horizontally from the vat walls 124 (e.g., outwardly therefrom) and may serve as a connection platform to facilitate linkage thereof with other components of the resin vat system 100, such as the flexible plastic film 104 and/or the attachment tray 120. To that end, the vat base 126 may include a plurality of base through-holes 128 therein, through which, for example, the fasteners 122 can extend to facilitate the desired linkage with one or more other members.

In turn, the flexible plastic film 104 and the attachment tray 120 can, respectively, include a plurality of film through-holes 130 and a plurality of frame holes 132 for correspondingly receiving the fasteners 122, thereby permitting a perimeter portion of the flexible plastic film 104 to be sandwiched and sealed between the attachment tray 120 and the vat base 126, upon tightening of the fasteners 122. It is to be understood that the frame holes 132 may or may not be through-holes, depending in part, as to whether it is desired for the fasteners 122 to yet further connect with an outer portion of the support tray 112. In embodiments, the attachment tray 120, the vat base 126, and the fasteners 122 can be configured to promote a close fit between the flexible plastic film 104 and the transparent support window 106 (e.g., maximizing heat conduction therebetween and/or ensuring full mechanical support of the flexible plastic film 104 by the transparent support window 106). In some embodiments, the attachment tray 120, the vat base 126, and the fasteners 122 can be configured to stretch and/or bias the flexible plastic film 104 across the transparent support window 106 and, potentially, over the edges thereof. In an embodiment, the fasteners 122 can be screws or bolts working in conjunction with through-holes or tapped holes. In an embodiment, the fasteners 122 may be any mechanism (e.g., a cam-style locking mechanism, a C-clamp style mechanism, powerful magnets, etc.) configured to clamp and thus sandwich the flexible plastic film 104 between the attachment tray 120 and the vat base 126.

The flexible plastic film 104 and the transparent support window 106 can work together, along with the support tray 112 (upon which a perimeter of the transparent support window 106 can ultimately rest), to support the weight of the resin-print material mixture. The flexible plastic film 104, the transparent support window 106, and the transparent conductive coating 108 can be transparent at least to UV light and may appear to be optically transparent, while the support tray 112 can have an open interior such that light, for example, may pass therethrough and be able to impact at least one of the transparent support window 106 or the transparent conductive coating 108. That is, the support tray 112 can define an outer tray portion configured to carry the transparent support window 106 (e.g., proximate the perimeter of the transparent support window 106).

In embodiments, the transparent support window 106 can be rigid (e.g., able to support the resin and/or part being printed), able to transmit light (e.g., ultraviolet (UV) light), and be thermally stable at least at the desired heat levels (e.g., at a cure or set temperature—about 50° C.-60° C., in one embodiment). The transparent support window 106 can be made of a glass or a plastic. In some embodiments, the plastic used can be polyethylene terephthalate (PET), high-density polyethylene (HDPE), or another rigid and transparent plastic material. For example, PET has a melting temperature of 260° C., making it safe to use at the desired heat levels, and it has a high UV transmittance, thereby making PET a good candidate material for the transparent support window 106. Further, sheets of PET coated with indium tin oxide (ITO) are commercially available. In an embodiment, the glass used can be a soda-lime-silica glass. In some embodiments, the transparent support window 106 can be at least semitransparent and/or translucent, so long as sufficient light can reach the printing zone to effect photocuring.

In embodiments, the transparent conductive coating 108 may include one or more of indium tin oxide (ITO), fluorine doped tin oxide (FTO), doped zinc oxide (e.g., aluminum-doped zinc oxide (AZO)), or another transparent conductive oxide (TCO); poly(3,4-ethylenedioxythiophene) (PEDOT), PEDOT doped with poly(styrene sulfonate) (PEDOT-PSS), or another transparent conductive polymer (TCP); a transparent nanowire mesh/film (e.g., made of silver nanowires); and/or a carbon nanotube-based (CNT-based) thin film. In an embodiment, the transparent conductive coating 108 may be razor thin (e.g., nanometers to microns thick, such as 10 nm to 100 μm; 10 nm to 50 μm; 10 nm to 100 nm; less than 25 μm; less than 10 μm; or less than 100 nm). In an embodiment, the transparent conductive coating 108 can be located at least on the side of the transparent support window 106 opposite the flexible plastic film 104, as shown in FIGS. 1 and 2. In an embodiment, the transparent conductive coating can be located on both major surfaces (e.g., both the side opposite the flexible film 104 and the side facing the flexible film 104) of the transparent support window 106, with sufficient conductive material along the edges thereof to electrically couple the transparent conductive coating on the two major surfaces (not specifically shown).

In an embodiment, the transparent conductive coating 108 is configured to have an electrical resistance sufficient to promote heating of the resin/print mixture proximate the flexible plastic film 104. In an embodiment, the transparent conductive coating 108 can be at least semi-transparent. In an embodiment, the transparent support window 106 can be at least semi-transparent or translucent. In an embodiment, the transparent conductive coating 108 and the transparent support window 106 can be sufficiently transparent to facilitate photocuring of the resin/print mixture used to form a structure being formed in a 3D printing process.

The transparent conductive coating 108 can be continuous across the entire area of the transparent support window 106. In some embodiments, the transparent conductive coating 108 may extend across substantially the entire area thereof (e.g., with gaps between two or more portions of the transparent conductive coating 108). In some embodiments where the transparent conductive coating 108 extends across substantially the entire area, the transparent conductive coating 108 can include portions that are closely spaced relative to one another (e.g., three millimeters (3 mm) or less)), such as in a row pattern connected in series or in parallel. In embodiments, the transparent conductive coating 108 can be distributed and configured to promote even heating of an entire resin layer (e.g., the resin/print material layer) proximate the flexible plastic film 104.

In an embodiment, the support tray 112 carries a set of metal contacts 110, with the metal contacts 110 configured to deliver electrical current/power to the transparent conductive coating 108. In an embodiment, such as shown in FIG. 1, the metal contacts 110 may be brought into direct contact with the transparent conductive coating 108. In an embodiment, such as shown in FIG. 2, the metal contacts 110 may be brought into direct contact with a set of metal bus bars 118 that are deposited or otherwise mounted on the transparent conductive coating 108, with the metal bus bars 118 configured to transfer electrical flow from the metal contacts 110 to the transparent conductive coating 108.

The metal contacts 110 may receive power from, for example, a direct current (DC) source or an alternating current (AC) source (not shown). In an embodiment, the supply of power may be adjustable (e.g., 0-60 volts (V) DC or 0-120V AC). In an embodiment, the metal contacts 110 may have a portion that is configured to plug or otherwise insert into an electrical socket element (e.g., configured to electrically couple to a power source (not shown) and/or the controller 114) further carried by the support tray 110. In an embodiment, the metal contacts 110 may be deposited or otherwise formed on the support tray 110 and electrically coupled to a power source (not shown) and/or the controller 114, for example, by electrical leads, vias, etc.

In an embodiment, an electrical isolation member (not shown) can be located between a respective metal contact 110 and the support tray 112. The electrical isolation member may be made of an electrically insulating material such as, for example, a ceramic, a plastic, an insulating rubber, an insulating foam, or a non-conductive composite. The electrical isolation member(s) may be used, for example, if the support tray 112 is made of a metal or another conductive material. The electrical isolation member(s) may be deposited on or otherwise carried by the support tray 112.

In some embodiments, the resin vat system 100 can include a controller 114 operatively coupled to the metal contacts 110. The controller 114 can be configured to control the amount of energy (e.g., power and/or current) that is directed from a source of electrical energy to the transparent conductive coating 108 and thereby control the amount of heat generated by the transparent conductive coating 108. The controller 114 thereby can be used to regulate the temperature of the resin in the heated resin vat 102. The controller 114 can be further electrically and communicatively connected to one or more temperature sensors 116. The controller 114 can be configured to communicate with the at least one temperature sensor 116 and to control an amount of heat generated by the transparent conductive coating 108 based on a feedback from the at least one temperature sensor 116.

In some embodiments, a given temperature sensor 116 may be a thermocouple, a thermistor, or a thermal imaging device. In some embodiments, at least one temperature sensor 116 can be positioned and configured to detect a temperature proximate the bottom of the resin vat 102 (e.g., proximate the zone where 3D printing is actively occurring). In an embodiment, the one or more temperature sensors 116, by way of example, may be mounted within a corresponding vat wall 124 of the resin vat 102 (such as shown in FIG. 1), carried on an interior surface of a vat wall 124 (not shown), placed at a lower corner of the resin vat 102, placed between the resin vat 102 and the flexible plastic film 104, placed between the flexible plastic film 104 and the transparent support window 106, and/or under the transparent support window 106 (e.g., proximate the transparent conductive coating 108). It has been determined that, for the desired range of resin temperatures used herein, there can be a fixed temperature deviation of about 3° C. between the resin and the bottom of the transparent support window 106, and that factor can be used to approximate the resin temperature where a temperature sensor 116 is placed, for example, proximate the bottom of the transparent support window 106 (e.g., against the transparent conductive coating 108).

The one or more temperature sensors 116 can be configured to determine the temperature of the resin/print mixture at one or more points in the resin vat 102 (e.g., at least proximate the flexible plastic film 104, for example, in contact therewith or within 1-3 millimeters (mm) thereof (e.g., within 2 mm)). In an embodiment, the heating of the transparent conductive coating 108 may be controlled such that a temperature registered at a first temperature sensor located within the resin vat 102 and proximate the flexible plastic film 104 (e.g., in contact therewith or within 1-3 mm thereof) is at or above a desired set point (e.g., a temperature within the resin/print material mixture determined to maximize print formation, quality, etc.).

In an embodiment, a second temperature sensor (not shown) may be employed either at another location proximate the flexible plastic film 104 (e.g., to help ensure even heating) or at a location spaced a distance (e.g., one centimeter (1 cm)) above the flexible plastic film 104 and above the first temperature sensor. In an embodiment, the second temperature sensor 116 being spaced above the flexible plastic film 104 can be used to help maintain the temperature of the resin at that height at a temperature below the desired set point (e.g., 5-10° C. below the set point). In an embodiment, a second temperature sensor 116 can be located under the transparent support window 106 proximate the transparent conductive coating 108, to facilitate monitor and control of the temperature of the transparent conductive coating 108 (e.g., to avoid potential overheating of that layer, given that its cost of replacement).

In an embodiment, the controller 114 and its related components can be configured such that the resin can be evenly heated to a temperature (e.g., a desired set or cure temperature) proximate to and across the exposed surface area of the flexible plastic film 104. It is to be understood that using one or more thermal sensing components (e.g., at various locations within the resin vat system 100) and/or more than one type of thermal sensing component (e.g., as part of the resin vat system 100) is within the scope of the present disclosure. Such use of multiple ones of and/or multiple types of thermal sensing components can promote greater control of processing temperatures and/or heat input.

In an embodiment, the controller 114 can operate by taking input data from the one or more temperature sensors 116 placed throughout the resin vat system 100. The controller 114 and its underlying code or software can use the data from these temperature sensors 116 to calculate how much energy (e.g., power/current) the heated glass (e.g., transparent support window 106 in combination with the transparent conductive coating 108) is to receive throughout the heating process. The energy received by the transparent conductive coating 108 can determine, in part, how hot the heated glass is ultimately going to be (e.g., along with the heat capacity of the resin to be heated; heat loss to other components; etc.). For example, the detection of a resin or resin/print material mixture temperature (e.g., by the one or more temperature sensors 116) that is too low can prompt an increase of the energy (e.g., current/power) delivered to the heated glass. Detection that the resin or resin/print material mixture temperature is too high can result in a decrease of the energy delivered to the heated glass. In some embodiments, detection of the overheating of the transparent conductive coating 108 itself can result in a decrease or even a cut-off of energy being delivered to the heated glass (e.g., until a safe operating temperature is again reached thereat), regardless of the temperature of the resin in the resin vat 102.

In some embodiments, an algorithm associated with the controller 114 can be used to determine how much energy is to be delivered to the glass by calculating the proportional, integral, and/or derivate (PID) parameters, where the controller 114 is a PID controller. The P parameter is calculated by multiplying the PID error times the Kp constant. The PID error is the difference between the set temperature and the current temperature reading. The I parameter is calculated by summing up the PID error over time and continually multiplying this sum by the Ki constant. The D parameter is calculated by multiplying the Kd constant by the rate of change of the PID error over a predetermined time period. The PID variables are then summed, and the power output is determined from this value. In some embodiments, this system can keep the temperature of the resin in a 10-degree temperature range (e.g., 50-60° C., in an embodiment).

FIGS. 5-8 show an additive-manufacturing (e.g., three-dimensional (3D) printing) resin vat system 200, in accordance with an embodiment of the present disclosure. The resin vat system 200 can generally include a resin vat 202 for carrying a resin-print material mixture (not shown), a flexible plastic film 204, a transparent support window 206, a transparent conductive coating 208, a set of metal contacts 210, a support tray 212, a set of metal bus bars 218, a multi-part attachment tray 220 (an upper attachment tray 220A, a middle attachment tray 220B, and a lower attachment tray 220C), a plurality of fasteners 222, one or more gaskets 234, a contact carrier frame 236, and a set of insulating end caps 238. In the resin vat system 200, like numbered parts (e.g., resin vat 102 and resin vat 202; and flexible plastic film 104 and flexible plastic film 204) can be expected to be constructed and function in a similar manner as those in the resin vat system 100, unless otherwise expressly discussed herein. Although not shown, the resin vat system 200 may also include, for example, a controller, like the controller 114, and one or more temperature sensors, like the temperature sensor 116. In an embodiment, the attachment tray 220 can serve to support the resin vat 202 and the transparent support window 206 and to hold and/or bias the flexible plastic film 204.

Figure 6:
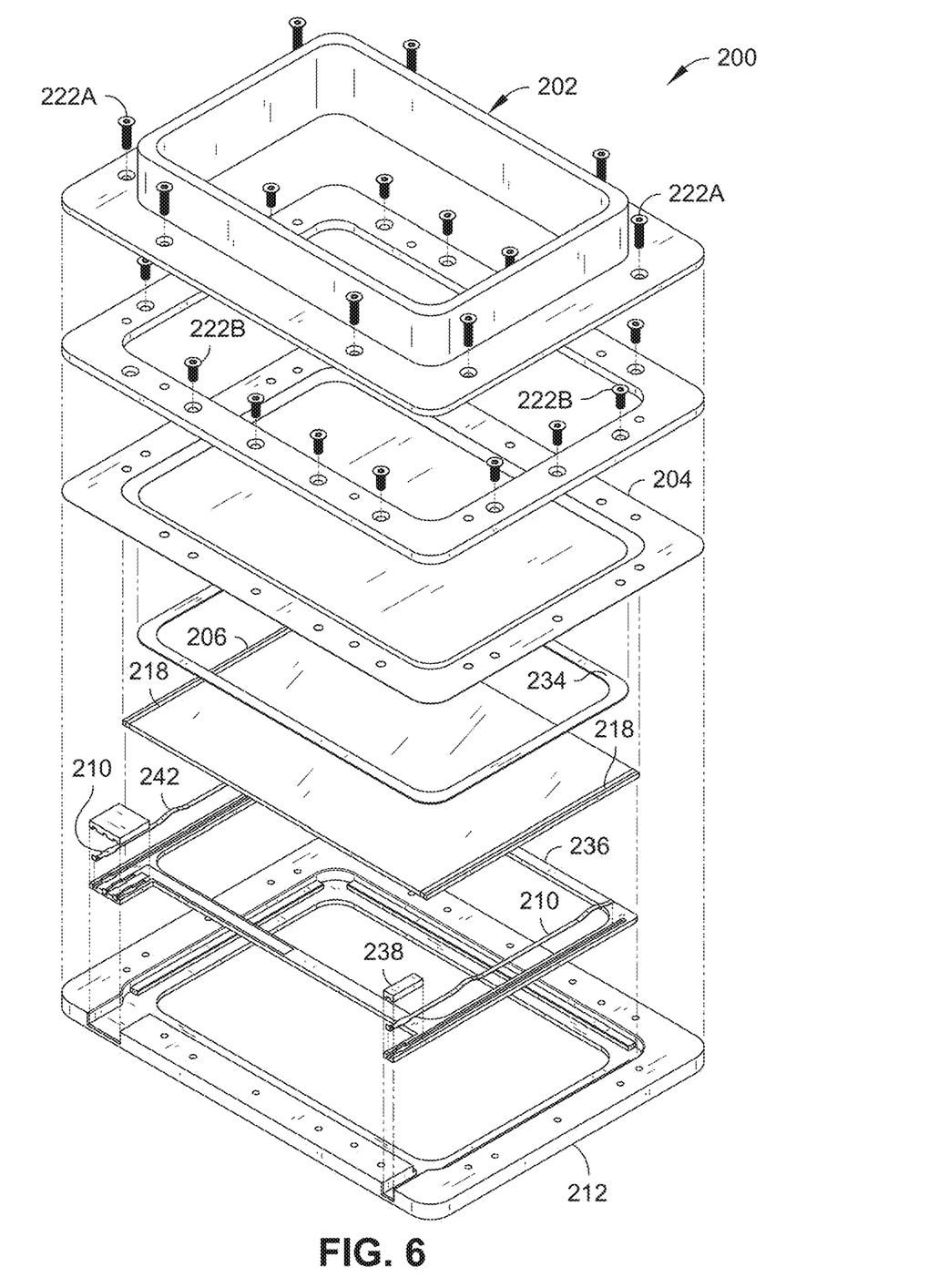
FIG. 6 is an exploded, top, isometric view of the additive-manufacturing (e.g., three-dimensional (3D) printing) resin vat assembly shown in FIG. 5.
Figure 7:
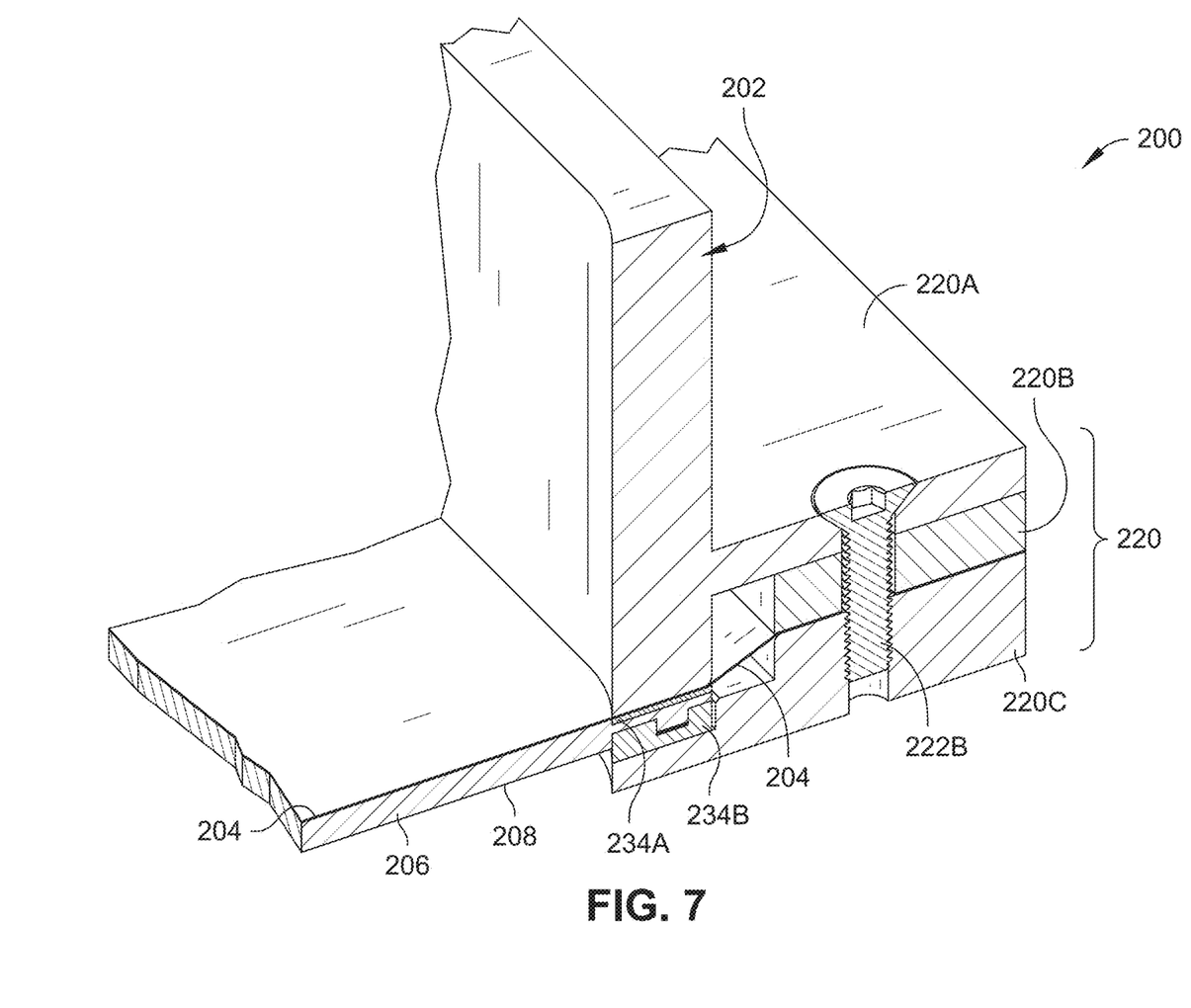
FIG. 7 is a schematic, sectional view of the connection between a resin vat, a transparent-conductive-coated support window, a flexible plastic film, and an attachment tray system of the additive-manufacturing (e.g., three-dimensional (3D) printing) resin vat assembly shown in FIG. 5.

FIGS. 6 and 7 together help to illustrate the connection between the resin vat 202, a flexible plastic film 204, a transparent-conductive-coated support window 206, and an attachment tray system 220, including the upper attachment tray 220A, the middle attachment tray 220B, and the lower attachment tray 220C. The upper tray 220A can be co-molded with, joined to, or otherwise coupled with an outer, lower portion of the resin vat 202. A first set of fasteners 222A (e.g., screws or bolts) can be used to attach the upper tray 220A and thus the resin vat 202 to at least the middle attachment tray 220B and, optionally, depending on the construction (e.g., length of the fasteners 222A and provision of related connection holes), the lower attachment tray 220C. The second set of fasteners 222B can be used to connect the middle attachment tray 220B to the lower attachment tray 220C, with the fasteners 222B extending through the flexible plastic film 204. The related connection holes in the various components through which the fasteners 222A and 222B can extend may be shown but are not labelled.

By extending through the flexible plastic film 204, the fasteners 222B can help hold the flexible plastic film 204 in place relative to the top of the transparent-conductive-coated support window 206 and thus pull and/or bias the flexible plastic film 204 there towards (e.g., with the end result of helping keep the flexible plastic film 204 taut across the support window 206). The biasing of the flexible plastic film 204 can be aided by a height offset between the distal bottom surface of the resin vat 202 and the top of the lower attachment tray 220C (e.g., pulling a portion of the flexible plastic film 204 at an angle). The grip and/or seal between the bottom of the resin vat 202, the flexible plastic film 204, and the transparent-conductive-coated support window 206 can be aided by the presence of one or more gaskets 234 (e.g., an upper gasket 234A located between the resin vat 202 and the flexible plastic film 204; and/or a lower gasket 234B located between the flexible plastic film 204 and the lower attachment tray 220C) sized and configured to extend between the sealing region between such components.

Figure 8:
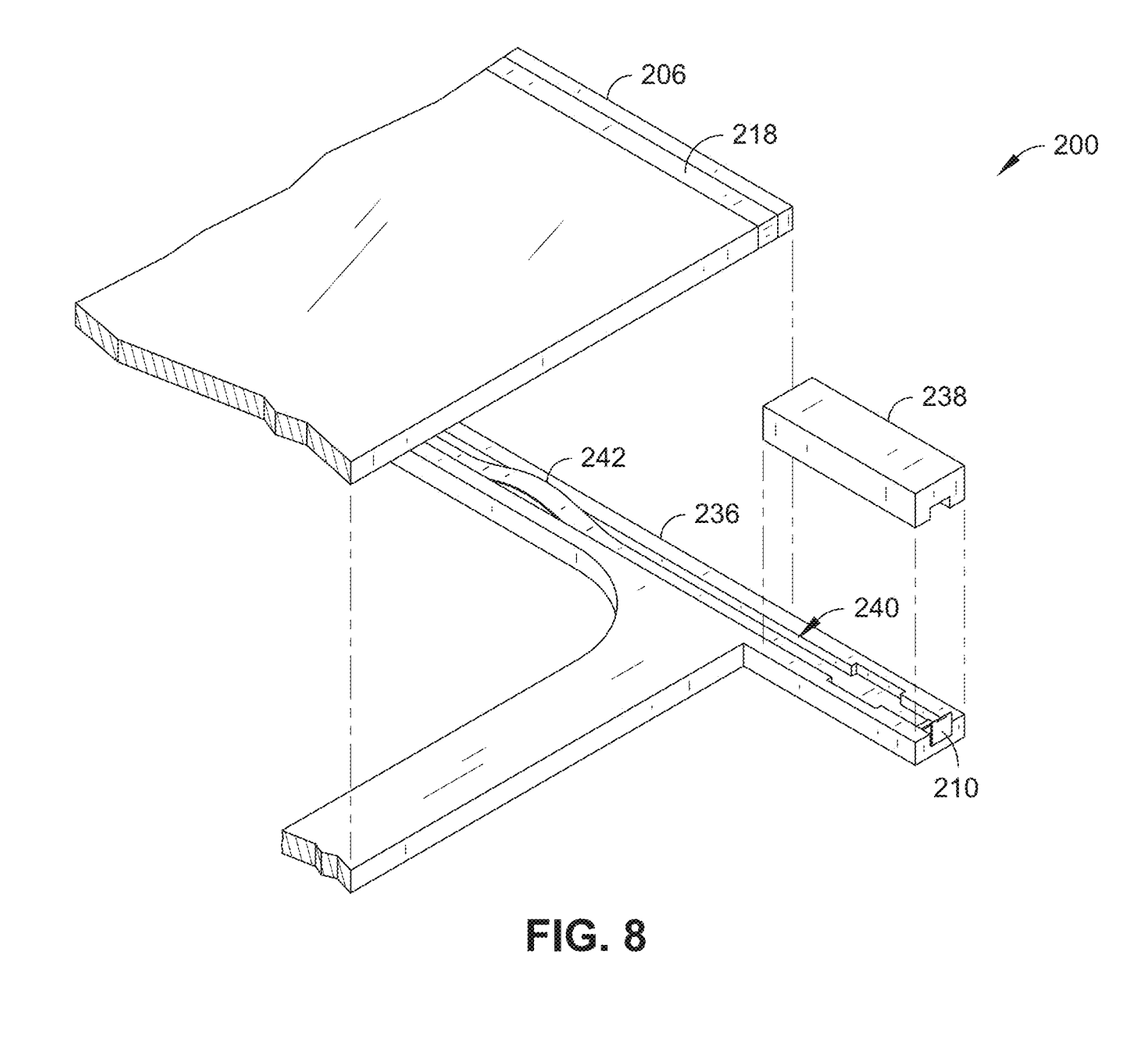
FIG. 8 is a schematic, sectional, exploded view of the connection between the transparent-conductive-coated support window, a plurality of bus bars carried thereby, a set of metal contacts, a support tray, and a set of insulating end caps of the additive-manufacturing (e.g., three-dimensional (3D) printing) resin vat assembly shown in FIG. 5.

FIGS. 6 and 8 together help illustrate the electrical connection elements and insulative portions associated with the resin vat system 200. The transparent support window 206 can have a transparent conductive coating 208 on at least a bottom surface (e.g., surface opposite the resin vat 202) thereof. The set of bus bars 218 (e.g., formed of a metal or another sufficiently conductive material) can be formed on or otherwise attached to, e.g., opposed distal sides of that bottom surface (e.g., opposed short edges of a rectangular support window 206, as shown in FIGS. 5-8) and on the transparent conductive coating 208. Upon provision of a current flow to the two opposed bus bars 218, the transparent conductive coating 208 lying therebetween can generate heat due to its latent resistance. The opposed bus bars 218 can receive current from the corresponding set of metal contacts 210 carried in the contact carrier frame 236, with the contact carrier frame 236, in turn, being received and carried by the support tray 212. In embodiments, a portion of each metal contact 210 can extend beyond the contact carrier frame 236 and/or the support tray 212 to facilitate electrical connection with, for example, an electrical controller, power supply, etc.

The contact carrier frame 236 can be made of an electrically insulative material (e.g., a plastic, ceramic, or non-conductive composite), thereby increasing the material options for the support tray 212. For example, by using an insulative contact carrier frame 236, the support tray 212 may be made of any of a plastic, a ceramic, a metal, composite, etc., based on, for example, mechanical considerations and not necessarily the conductivity thereof. In an embodiment, the support tray 212 may be constructed (e.g., provided with grooving and/or recesses) to receive the insulative carrier frame 236 therein, such as shown. In an embodiment, the upper faces (e.g., facing the resin vat 202) of the contact carrier frame 236 and the support tray 212 may be coplanar with one another. In embodiments, the set of insulating end caps 238 can provide an insulative cover for a respective end portion of the metal contacts 210 that may otherwise be exposed.

In an embodiment, the insulative carrier frame 236 can be provided with a pair of contact-carrier grooves 240 therein in which the respective metal contacts 210 can be inserted. The contact-carrier grooves 240 can aid in electrically isolating the metal contacts 210 within the contact carrier frame 236. In some embodiments, such as illustrated in FIGS. 6 and 8, the metal contacts 210 can be provided with one or more upwardly-extending contact bumps 242. Such contact bumps 242 can facilitate electrical contact of a given metal contact 210 with a corresponding metal bus bar 218 and/or directly with the transparent conductive coating 208, while permitting most of the metal contact 210 to otherwise be isolated within a given contact-carrier groove 240. The contact bumps 242 can also serve as a biasing and/or spring mechanism to promote a good electrical connection with, for example, the transparent conductive coating 208 and/or a corresponding metal bus bar 218.

In embodiments, the system controller (e.g., controller 114) can include a processor, a memory, and a communications interface. The processor provides processing functionality for at least the controller and can include any number of processors, micro-controllers, circuitry, field programmable gate array (FPGA) or other processing systems, and resident or external memory for storing data, executable code, and other information accessed or generated by the controller. The processor can execute one or more software programs embodied in a non-transitory computer readable medium that implement techniques described herein. The processor is not limited by the materials from which it is formed or the processing mechanisms employed therein and, as such, can be implemented via semiconductor(s) and/or transistors (e.g., using electronic integrated circuit (IC) components), and so forth.

The memory can be an example of tangible, computer-readable storage medium that provides storage functionality to store various data and or program code associated with operation of the controller, such as software programs and/or code segments, or other data to instruct the processor, and possibly other components of the resin vat system 100, to perform the functionality described herein. Thus, the memory can store data, such as a program of instructions for operating the resin vat system 100 (including its components), and so forth. It should be noted that while a single memory is described, a wide variety of types and combinations of memory (e.g., tangible, non-transitory memory) can be employed. The memory can be integral with the processor, can comprise stand-alone memory, or can be a combination of both.

Some examples of the memory can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, remove (e.g., server and/or cloud) memory, and so forth. In implementations, memory can include removable integrated circuit card (ICC) memory, such as memory provided by a subscriber identity module (SIM) card, a universal subscriber identity module (USIM) card, a universal integrated circuit card (UICC), and so on.

The communications interface can be operatively configured to communicate with components of the resin vat system 100. For example, the communications interface can be configured to transmit data for storage by the resin vat system 100, retrieve data from storage in the resin vat system 100, and so forth. The communications interface can also be communicatively coupled with the processor to facilitate data transfer between components of the resin vat system 100 and the processor. It should be noted that while the communications interface is described as a component of controller, one or more components of the communications interface can be implemented as external components communicatively coupled to the resin vat system 100 or components thereof via a wired and/or wireless connection. The resin vat system 100 or components thereof can also include and/or connect to one or more input/output (I/O) devices (e.g., via the communications interface), such as a display, a mouse, a touchpad, a touchscreen, a keyboard, a microphone (e.g., for voice commands) and so on.

The communications interface and/or the processor can be configured to communicate with a variety of different networks, such as a wide-area cellular telephone network, such as a cellular network, a 3G cellular network, a 4G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface can be configured to communicate with a single network or multiple networks across different access points. In a specific embodiment, a communications interface can transmit information from the controller to an external device (e.g., a cell phone, a computer connected to a WiFi network, cloud storage, etc.). In another specific embodiment, a communications interface can receive information from an external device (e.g., a cell phone, a computer connected to a WiFi network, cloud storage, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An additive-manufacturing heated resin vat system, comprising:
    a resin vat for carrying a resin-print material mixture;
    a plastic film mechanically sealed relative to a bottom of the resin vat;
    a transparent support window supporting the plastic film;
    a transparent conductive coating formed on the transparent support window, the transparent conductive coating being located at least on a side of the transparent support window opposite the plastic film and on a side of the transparent support window supporting the plastic film;
    a support tray defining an outer tray portion and an open tray interior, the outer tray portion carrying the transparent support window, the open tray interior configured to allow light to pass therethrough and impact at least one of the transparent support window or the transparent conductive coating; and
    a set of metal contacts carried by the outer tray portion and configured to electrically couple with the transparent conductive coating on the transparent support window, the metal contacts configured to carry an electrical current therethrough, the transparent conductive coating configured to generate heat upon exposure to the electrical current received from the metal contacts.

2. The additive-manufacturing heated resin vat system of claim 1, further comprising:
    at least one temperature sensor positioned and configured to detect a temperature in the resin vat.

3. The additive-manufacturing heated resin vat system of claim 2, wherein the at least one temperature sensor includes a first temperature sensor located within the resin vat and proximate the plastic film.

4. The additive-manufacturing heated resin vat system of claim 3, wherein the controller is configured to maintain a temperature of the resin/print mixture proximate the plastic film at or above a desired set point.

5. The additive-manufacturing heated resin vat system of claim 2, further comprising:
    a controller configured to communicate with the at least one temperature sensor and to control an amount of heat generated by the transparent conductive coating based on a feedback from the at least one temperature sensor.

6. The additive-manufacturing heated resin vat system of claim 1, wherein the transparent conductive coating comprises one or more of indium tin oxide (ITO), fluorine-doped tin oxide (FTO), a doped zinc oxide, or another transparent conductive oxide (TCO); poly(3,4-ethylenedioxythiophene) (PEDOT), PEDOT doped with poly(styrene sulfonate) (PEDOT-PSS), or another transparent conductive polymer (TCP); a transparent nanowire mesh or film; or a carbon nanotube-based (CNT-based) thin film.

7. The additive-manufacturing heated resin vat system of claim 1, wherein the transparent conductive coating is configured to have an electrical resistance sufficient to promote heating of the resin-print material mixture proximate the plastic film.

8. The additive-manufacturing heated resin vat system of claim 1, wherein the transparent conductive coating is continuous across at least one major surface of the transparent support window.

9. The additive-manufacturing heated resin vat system of claim 1, further comprising an attachment tray configured to support the resin vat and the transparent support window and to bias the plastic film.

10. An additive-manufacturing heated resin vat system, comprising:
    a resin vat for carrying a resin-print material mixture;
    a transparent support window supporting the resin vat;
    a transparent conductive coating formed on the transparent support window, the transparent conductive coating being located at least on a side of the transparent support window opposite the resin vat and on a side of the transparent support window supporting the resin vat;

a support tray defining an outer tray portion and an open tray interior, the outer tray portion carrying the transparent support window, the open tray interior configured to allow light to pass therethrough and impact at least one of the transparent support window or the transparent conductive coating; and a set of metal contacts carried by the outer tray portion and configured to electrically couple with the transparent conductive coating on the transparent support window, the metal contacts configured to carry an electrical current therethrough, the transparent conductive coating configured to generate heat upon exposure to the electrical current received from the metal contacts.

11. The additive-manufacturing heated resin vat system of claim 10, further comprising:

at least one temperature sensor positioned and configured to detect a temperature in the resin vat.

12. The additive-manufacturing heated resin vat system of claim 11, further comprising:

a controller configured to communicate with the at least one temperature sensor and to control an amount of heat generated by the transparent conductive coating based on a feedback from the at least one temperature sensor.

13. The additive-manufacturing heated resin vat system of claim 10, wherein the transparent conductive coating comprises one or more of indium tin oxide (ITO), fluorine-doped tin oxide (FTO), a doped zinc oxide, or another transparent conductive oxide (TCO); poly(3,4-ethylenedioxythiophene) (PEDOT), PEDOT doped with poly(styrene sulfonate) (PEDOT-PSS), or another transparent conductive polymer (TCP); a transparent nanowire mesh or film; or a carbon nanotube-based (CNT-based) thin film.

14. The additive-manufacturing heated resin vat system of claim 10, wherein the transparent conductive coating is configured to have an electrical resistance sufficient to promote heating of the resin-print material mixture in the resin vat.

* * * * *